United States Patent [19]
Eschbach

[11] Patent Number: 5,243,443
[45] Date of Patent: Sep. 7, 1993

[54] HALFTONING WITH ERROR FEEDBACK AND IMAGE DEPENDENT ENHANCEMENT

[75] Inventor: Reiner Eschbach, Webster, N.Y.

[73] Assignee: Xerox Corporation, Stamford, Conn.

[21] Appl. No.: 802,809

[22] Filed: Dec. 6, 1991

[51] Int. Cl.$^5$ .............................................. H04N 1/40
[52] U.S. Cl. .................... 358/455; 358/456; 358/465; 358/466
[58] Field of Search .............. 358/466, 455, 456, 465, 358/458, 460, 298; 382/50, 52; 359/447, 445

[56] References Cited

U.S. PATENT DOCUMENTS

| | | | |
|---|---|---|---|
| 4,051,536 | 9/1977 | Roetling | 358/298 |
| 4,149,194 | 4/1979 | Holladay | |
| 4,339,774 | 7/1982 | Temple | |
| 4,633,327 | 12/1986 | Roetling | |
| 4,654,721 | 3/1987 | Goertzel et al. | |
| 4,924,322 | 5/1990 | Kurosawa et al. | 358/448 |
| 4,955,065 | 9/1990 | Ulichney | 382/50 |
| 5,045,952 | 9/1991 | Eschbach | 358/447 |
| 5,130,819 | 7/1992 | Ohta | 358/445 |

OTHER PUBLICATIONS

An Adaptive Algorithm for Spatial Greyscale, Floyd and Steinberg, Proceedings of the SID, 17/2, 75–77 (1976).
A Survey of Techniques for the Display of Continuous Tone Pictures on Bilevel Displays, Jarvis et al., Computer Graphics and Image Processing, vol. 5, pp. 13–40 (1976).
MEECCA-A Multiple-Error Correction Computation Algorithm for Bi-Level Image Hardcopy Reproduction, Stucki, IBM Research RZ1060 (1981).
On the Error Diffusion Technique for Electronic Halftoning, Billotet-Hoffmann et al., Proceedings of the SID, vol. 24/3 pp. 253–258 (1983).
Digital Halftoning on the IBM 4250 Printer, Goertzel et al., IBM J Res Develop, vol. 31, No. 1, Jan. 1987, pp. 2–15.
"Images from Computers", M. Schroeder, IEEE Spectrum, Mar. 1969, pp. 66–78.
"Halftone Method With Edge Enhancement and Moire Suppression", P. G. Roetling, J. Opt. Soc. Amer., vol. 66, No. 10, Oct. 1976, pp. 985–989.

Primary Examiner—Edward L. Coles, Sr.
Assistant Examiner—Scott A. Rogers
Attorney, Agent, or Firm—Mark Costello

[57] ABSTRACT

A method and arrangement for quantizing gray level pixels using a combination of halftoning and error diffusion which initially determines a best fit halftone cell, and propagates halftoning error in order to maintain gray density, while reducing halftoning and error diffusion artifacts.

9 Claims, 3 Drawing Sheets

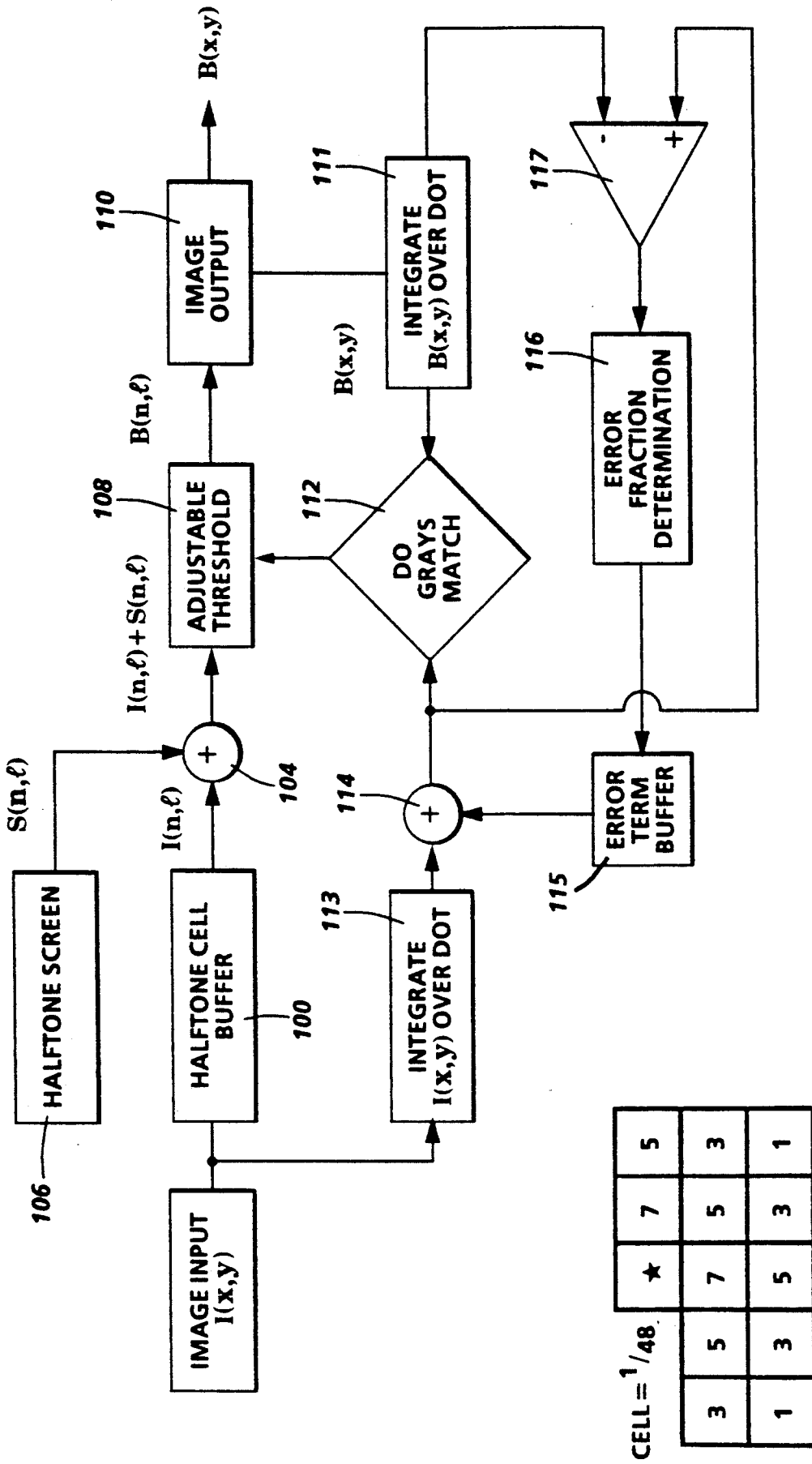

HALFTONING WITH ERROR FEEDBACK AND IMAGE DEPENDENT ENHANCEMENT

This invention relates to digital halftoning, combining a specific method of halftoning, which determine the best fit halftone screen, and an error diffusion scheme.

BACKGROUND OF THE INVENTION

Image information, be it color, black or white, is commonly generated in a bitmap format where the bitmap comprises a plurality of gray level pixels, i.e. pixels that are defined by digital values, each value representing a gray level among a number of gray levels. Thus, in an 8 bit system, 256 levels of gray are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce the gray level image data to a limited number of levels so that it is printed. Besides gray level information derived by scanning, certain processing techniques such as those described, for example, in U.S. patent application Ser. No. 07/600,542 entitled "Method for Image Conversions With Error Diffusion", by R. Eschbach, produce gray level pixel values which require conversion to a limited set of "legal" or output values.

One standard method of converting gray level pixel values to binary level pixel values is through the use of dithering or halftoning processes. In such arrangements, over a given area having a number of gray pixels therein, each pixel value of an array of gray level pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data. The effect of the distribution of black and white over the halftone cell is integrated by the human eye as gray. Dithering or halftoning presents problems, however, in that the amount of gray within an original image is not maintained exactly over an area, because the finite number of elements inside each dither matrix-and therefore halftone cell—only allows the reproduction of a finite number of gray levels, i.e. number of elements in the cell plus one, or less. The error arising from the difference between the output pixel value and the actual gray level pixel value at any particular cell is simply thrown away. This results in a loss of image information. In particular, dithering introduces coarse quantization artifacts which are visible in the image areas where the scene has little variation. This is also known as "banding", and is caused by the limited number of output gray levels available. The "banding" artifacts generally increase with decreasing cell size, which is identical to a decrease in the number of levels that can be represented by the halftone cell.

In the ARIES (Alias Reduction and Image Enhancement System) method of halftone reproduction, described by P. Roetling in "Halftone Method With Edge Enhancement and Moire' Suppression," J. Opt. Soc. Amer. Vol. 66, No. 10, pp. 985-989, October, 1976, image information initially has a set of halftone screen values for a cell added to the information. A uniform threshold value is applied to the screened information, to produce an output value. The average gray value over the cell area of the input image is compared to the average gray value over the cell area of the output image. See, also, U.S. Pat. No. 4,051,436 to Roetling and U.S. Pat. No. 4,633,327 to Roetling. In this way, the error between original and output is minimized over each halftone cell. The banding artifact, however, is not reduced.

Algorithms that convert gray images to binary or other number of level images attempting to preserve the local density exist, and include among them error diffusion, as taught, for example, in "An Adaptive Algorithm for Spatial Greyscale" by Floyd and Steinberg, Proceedings of the SID 17/2, 75-77 (1976) (hereinafter, "Floyd and Steinberg"). Another, more elaborate method would be the error diffusion techniques of U.S. Pat. No. 5,045,952 to Eschbach, which serves to provide image dependent edge enhancement, assigned to the same assignee as the present invention. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13-40 (1976) (hereinafter, Jarvis), and in "MECCA-A Multiple-Error Correction Computation Algorithm for Bi-Level Image Hardcopy Reproduction" by Stucki, IBM Res. Rep. RZ1060 (1981)(hereinafter, Stucki). Modifications of the error calculation and weight allocation have been taught, for example, in U.S. patent application Ser. No. 07/672,987, entitled "Method for Image Conversion with Application of Multiple Error Diffusion Matrices", by Eschbach, U.S. Pat. 4,924,322 to Kurosawa et. al., U.S. Pat. No. 4,339,774 to Temple, and U.S. Pat. No. 4,955,065, to Ulichney.

Error diffusion attempts to maintain gray by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. A problem noted with the use of the standard error diffusion algorithms for printing applications is the production of large numbers of isolated black and/or white pixels which are non-printable by many types of printers. The algorithm taught by Billotet-Hoffmann and Bryngdahl, Proceedings of the SID, Vol. 24/3, (1983), pp. 253-258 shows a dither matrix used as a threshold for error diffusion, to alleviate the problems of undesired patterns generally produced by the error diffusion algorithm. A method to overcome the printability problem is taught by U.S. Pat. No. 4,654,721 to Goertzel, where a method is shown to convert a continuous tone image to a bilevel pixel image. The total error generated in one halftone cell is distributed to a predetermined number of adjacent halftone cells. In this way, printable images are generated, while the banding artifact is reduced, by alternating between fixed output cell patterns. Because of an inherent lack of partial dots in this process, evidenced as a loss in sharpness, edge detection and sharpening was included. See, also, "Digital Halftoning in the IBM 4250 Printer" by Goertzel et al. (Goertzel), IBM J. Res. Develop., Vol 31, No. 1, January, 1987. U.S. patent application Ser. No. 07/583,337 to Shiau, and Ser. No. 07/775,201 to Fan, teach the use of similar methods to reduce a continuous tone image to a multilevel pixel image with diffusion of error between adjacent halftone cells. These methods, however, do not determine a best fit halftone dot as done in the ARIES method.

In the MAE (Minimum Average Error) method of error diffusion described in "Images from Computers", by M. Schroeder, IEEE Spectrum, March 1969, pp. 66–78, a different error diffusion method is introduced, which determines error as a function of the original image and the output image (as opposed to the original image modified by error from previous pixels, and the output image). The result is less worming artifacts than Floyd and Steinberg, but a less precise graytone reproduction.

All of the references cited herein are incorporated by reference for their teachings.

SUMMARY OF THE INVENTION

In accordance with the invention, there is provided a method for quantizing gray level pixels using a combination of halftoning and error diffusion which initially determines a best fit halftone cell, and propagates halftoning error in order to maintain gray density.

In accordance with one aspect of the invention, there is provided a method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values, through a process of halftoning with a best fit threshold and halftone dot determination, and error diffusion. In this process, 'c' and 'd' are integer values representing pixel depth. In one embodiment, the value of gray in a portion of the input image corresponding to a halftone cell is integrated to produce an average input gray value. An error value is added to each pixel in the original image, that belongs to a current halftone cell, from processing of previous pixels in the image, beloging to a predetermined set of previously processed halftone cells, in accordance with the method, to produce a modified input value, for each pixel of the current halftone cell. To each modified input value, a screen value is added, from a set of stored screen values to generate a screened modified input value. The screened modified input value is compared to a threshold value, to produce an output which is one of a desired output set of values. The value of the gray level of the output image in the portion of the output image corresponding to a halftone cell is integrated to produce an average output gray value. The average output gray value is compared to the average modified input gray value, to determine a input/output difference. The input/output difference controls the threshold value, so that the threshold is set to attempt maintain gray density equal between the input image and the output image. Following the halftoning step, an error is calculated between the average gray value of the original image and the average gray value of the output image and preselected fractions thereof are forwarded to unprocessed pixels belonging to a preselected set of unprocessed halftone cells.

In this way, the average modified input gray value is represented by the average output gray value with an deviation of not more than 0.5 of one level over the full halftone cell, e.g.: for the simple example of a binary output, using a halftone cell of 2 by 2, five average output levels can be reproduced, i.e. 0, 0.25, 0.5, 0.75 and 1. The maximum deviation over this cell will be 0.5×0.25 (half of one level). Note, that standard halftoning procedures do not guarantee this maximum deviation, i.e. an average input gray level of 0.6 might be represented by an average output gray level of 0.75, dependent on the spatial detail of the input.

In accordance with another aspect of the invention, where the previous embodiment compared the average gray value of the original image to the average gray value of the output image to generate the error value, in a second embodiment, the average gray value of the modified image may be compared to the average gray value of the output image.

In accordance with yet another aspect of the invention, the error is forwarded, not to a preselected set of pixels, but to a buffer that is used in updating the average gray value calculation over one halftone cell for a preselected number of subsequent halftone cells.

These and other aspects of the invention will become apparent from the following descriptions to illustrate a preferred embodiment of the invention read in conjunction with the accompanying drawings in which:

FIG. 2 is one example of an error distribution matrix for error fraction determination and distribution;

FIG. 3 is a a block diagram showing an alternative system in which the present invention may find use.

Figure 1:
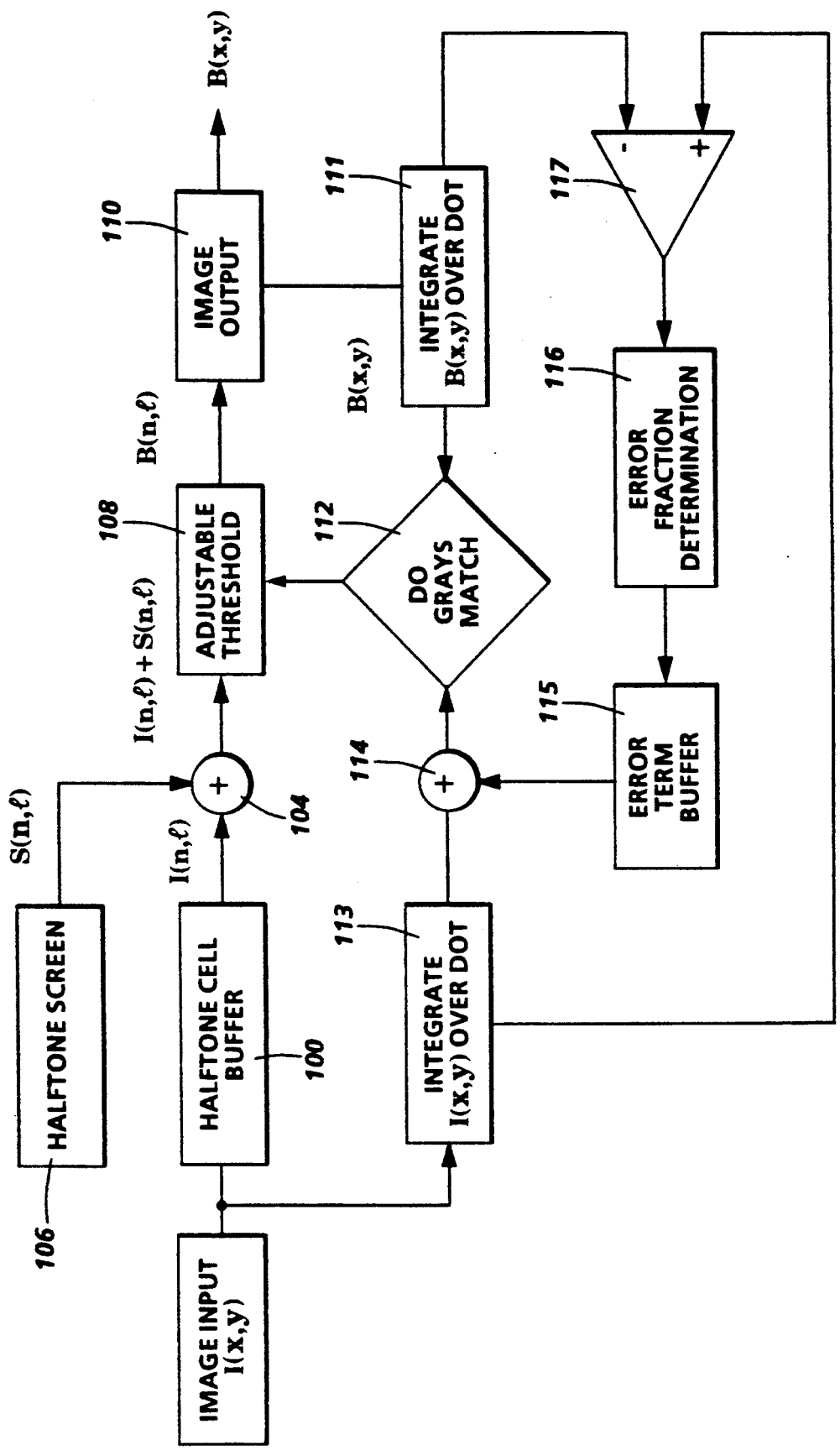
FIG. 1 is a block diagram showing a system in which the present invention may find use.

Referring now to the drawing where the showings are for the purpose of describing an embodiment of the invention and not for limiting same, a basic system for carrying out the present invention is shown in FIG. 1. In the present case, gray level image data from image input 10 may be characterized as image data, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth. Here, color data may be represented by a number of independent channels which are handled independently, or the color data might be represented as vector data in a predefined color space, e.g.: RGB, CIELab etc., being submitted to vector operations in the thresholding, error calculation and correction. One common case of this method includes the conversion of data from a relatively large set of gray level values to one of two legal or allowed bin values for printing in a binary printer. Another case of this is the conversion of data from a relatively large set of color data expressed as red, green and blue, or cyan, magenta, yellow and black, to one of five legal bin values for printing, as described in U.S. Pat. Appl. Ser. No. 07/755,380, entitled "Method for Quantization of Gray Level Pixel Data with Application of Under Compensated Error Diffusion", by Eschbach et al.

An input image of the type to be processed as hereinafter described may be represented by a set of gray values (gray level pixels) arranged in an array of L lines, each line containing N gray values with depth b, with any one pixel in said array denoted by I(n,l). Gray values are typically expressed as integers, with one example falling in the range from 0 to 255, although greater or lesser number of levels, as well as non-integer representations, are possible. An output image is considered to consist of pixels, each pixel corresponding to an output element that is printed by a digital printer or display.

With reference now to FIG. 1, image I(n,l) is received at image buffer 100, holding the information of one halftone cell. At adder 104, a halftone screen, S(n,l), a set of values stored in halftone memory 106, is added to each pixel value of I(n,l), to impose a periodic function thereon. The halftone screen may be the same screen for the whole image, but multiple screens may be used, with selection of the screen depending upon the current image data. At adjustable threshold 108, a threshold is applied to the image, now representable as the signal I(n,l)+S(n,l), where the threshold is adjustable from halftone cell to halftone cell, as will be further described, in accordance with the ARIES method of halftoning.

While halftoning has been described for simplicity as the addition of a set of selected screen values to pixel values within a defined area of the image, in conjunction with a uniform application of a threshold level(s) to the combined values, it will be understood that the process of halftoning may also be represented by a set of varying thresholds defined at locations corresponding to pixels over a given area of the image. A halftone cell, as used herein, is generally smaller than the total image and will be replicated in a predetermined scheme in order to cover an area of the image. A method for an efficient representation of variable angle halftone cells by a dither matrix and a corresponding replication scheme, is given in U.S. Pat. No. 4,149,194 to Holladay. The output of a process using a dither matrix is a set of pixel values, having a number of members less than the input set of values. Commonly, the set of output values is binary, either black or white, or a spot or no spot, although the values might be gray as described in U.S. patent application Ser. No. 07/583,337 by Shiau. The binary output of a single halftone cell is a set of pixels that are either black or white which together form a "dot". Single pixels, black or white, surrounded respectively by white or black pixels, are difficult to print with electrophotographic devices. For this reason, standard dither matrices for electrophotographic applications tend to cluster pixels together, with growth pattern that begins in a central area of the halftone cell and grows as more elements of the cell are black. Such a dot pattern is printable on electrophotographic devices.

The output of adjustable threshold 108, the signal B(n,l) which in a binary system is a set of binary, or black and white pixels, is stored to output buffer 110, from which it can be directed to an output device. Signal B(n,l) is also integrated to provide an average gray output value over a halftone cell at block 111, and the average gray output value is directed to comparator 112 (DO GRAYS MATCH) to be compared with the average gray input value of the input image over the halftone cell, generated at integrator 113 and corrected by error from previous cells added to the average gray value at adder 114 (as will be described further below). Comparator 112 adjusts variable threshold 108 to minimize the deviation between I(n,l) and B(n,l) over the halftone cell.

Error determination block 117 calculates a difference between the average gray input value generated at integrator 113 and average gray output value output generated at integrator 111. This gray value error is passed to error fraction determination block 116 where the fractional error values are calculated and passed to the error term buffer 115 to be used in the processing of subsequent halftone cells. FIG. 2 shows one such fractional error distribution, in which for each unprocessed halftone cell identified in a neighborhood of the current halftone cell identified by ★, a fractional error value, equal to the error $\epsilon$, multiplied by a coefficient corresponding to the halftone cell position in the neighborhood with respect to the halftone cell from which $\epsilon$ is derived, and the factor 1/48, will be added to a subsequent halftone cell. It will, of course, be appreciated that any particular halftone cell is a member of the neighborhoods of several halftone cells and accordingly, a final error term that is added to the halftone cell is the sum of several fractional errors. Other fractional error weighting and distribution schemes such as those described by Floyd and Steinberg, Jarvis, Stucki, U.S. patent application Ser. No. 07/755,380, entitled "Method for Quantization of Gray Level Pixel Data with Application of Under Compensated Error Diffusion", by Eschbach, and U.S. patent application Ser. No. 07/672,987, entitled "Method for Image Conversion with Application of Multiple Error Diffusion Matrices", by Eschbach, as well as many others, may be employed. While those schemes are described for pixel-to-pixel error distribution, the principal or error distribution on a dot-to-dot basis is similar.

As thus far described, the error diffusing functionality of the arrangement of FIG. 1 is generally similar to the MAE method of error diffusion of Schroeder. Clearly, the error diffusion method of Floyd and Steinberg could also be used, although the effect of limiting the distance by which error from a single pixel is propagated might be decreased. This method is shown in FIG. 3, where like numbers indicate like elements, and where the error is now calculated between the average modified input gray level taken after adder 114 and the average output gray level taken from block 111. As noted the significant difference between the two methods is that the error diffusion method of Floyd and Steinberg determines error as a function of the original image modified by error from previous pixels, and the output image, while the MAE method determines error as a function of the original image and the output image. It can no doubt be appreciated that the appropriate error term generated for each halftone cell can be used to update the value of each pixel before the integration block 113.

The reference to adding error to a halftone cell may be understood in either of two ways. Error may be distributed among pixels forming the halftone cell, which may alter the number of pixels ON or OFF determined for the cell, or alternatively, once a halftone cell is determined or the number of pixels ON or OFF determined for the cell, the number of pixels ON or OFF may be increased or decreased to represent the added error. The methods are equivalent for the purposes of this description.

As was previously noted, an adjustable threshold value is provided at adjustable threshold 108. Adjustment of T may be in accordance with the ARIES (Alias Reduction and Image Enhancement System) method of halftone reproduction, described by P. Roetling in "Halftone Method With Edge Enhancement and Moire' Suppression," J. Opt. Soc. Amer. Vol 66, No. 10, pp. 985-989, October, 1976, U.S. Pat. No. 4,051,536 to Roetling and U.S. Pat. No. 4,633,327 to Roetling, herein incorporated by reference.

Figure 4:
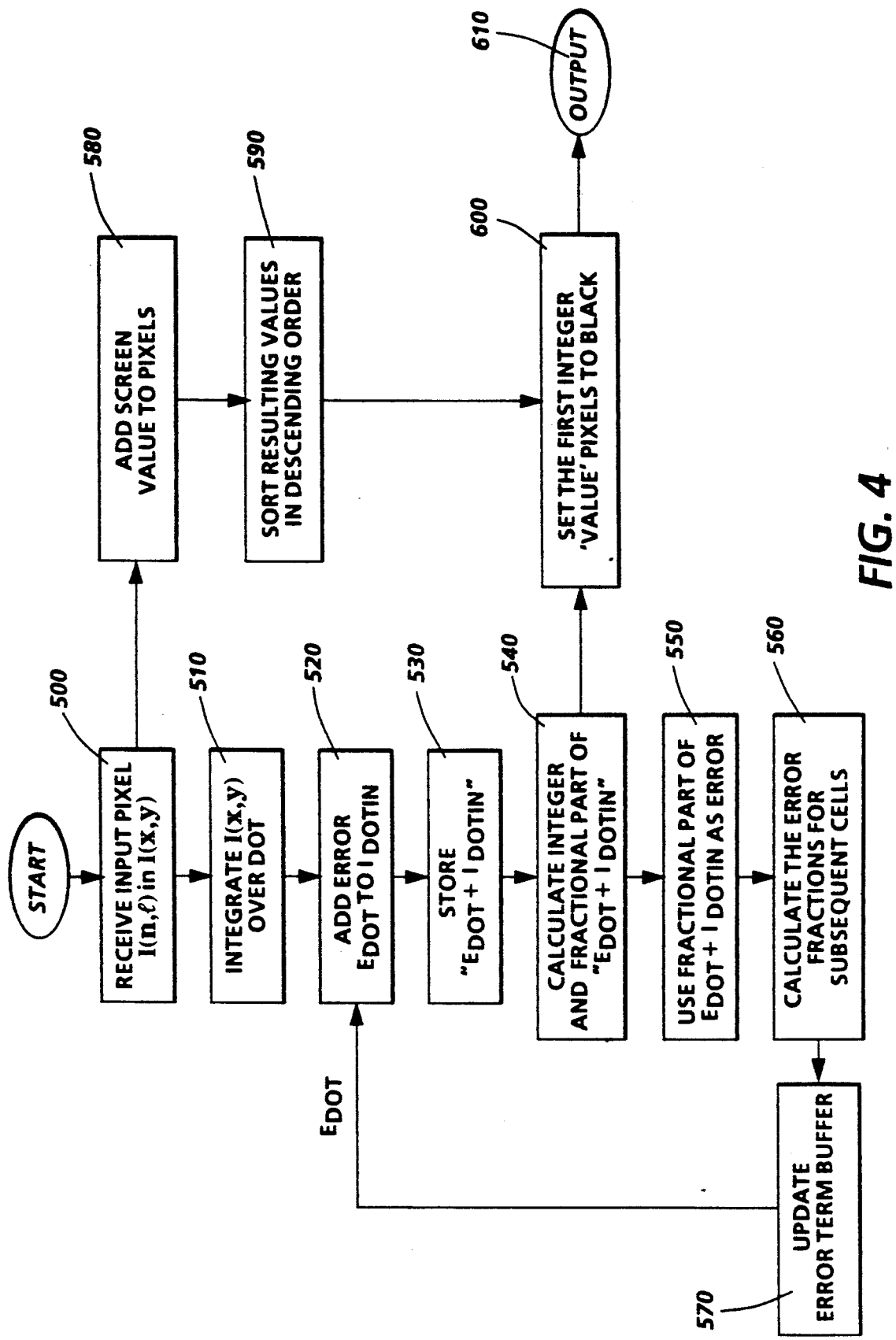
FIG. 4 is a flow chart of the present invention.

With reference now to FIG. 4, there is shown a flow chart demonstrating the steps of the inventive process of quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, including steps 500) receiving an input pixel having a pixel value I(n,l) in the image I(x,y); 510) integrating or averaging I(x,y) over a halftone cell or dot to produce an average gray input value $I_{DOTIN}$ for the dot; 520) adding a corresponding gray error term $E_{DOT}$ for the halftone cell to the average gray input value $I_{DOTIN}$; and 530), storing the modified average gray input value $I_{DOTIN}+E_{DOT}$. At step 540, for the halftone dot, an integer and fractional part of the modified gray input value are calculated, where the integer part refers to the total gray value, including error, over one halftone cell, expressed in pixel units to be printed black (#black pixels), while the fractional part $E_{DOTIN}$ refers to the difference between the integer part and the modified gray input value $I_{DOTIN}+E_{DOT}$. At step 550, the fractional part $E_{DOTIN}$ of the value is used as a gray error measure, to calculate gray error fractions for subsequent halftone cells; at step 560 gray error fractions are calculated based on a weighted error distribution such as that described in FIG. 2, and at step 570, the error term buffer is updated to be used in subsequent halftone cells as error values $E_{DOT}$ to be added at step 520, where $E_{DOT}$ is the sum of error fractions of one or more halftone dots At step 580, halftone screen values are added to the input pixels received at step 500, in accordance with the position of the pixel in the cell; and at step 590, the resultant values are arranged or sorted in a way that allows to identify pixels that will be set to black. Then, at step 600, a number of pixels from the arrangement of values are set to "black", based on the information about the integer part of the modified gray value, from block 540. At output step 610, the pixels are directed to an output, with the original spatial arrangement of the pixels received at step 500 maintained, while the pixel values have been quantized.

Adjustment of T may be in accordance with the ARIES (Alias Reduction and Image Enhancement System) method of halftone reproduction, described by P. Roetling in "Halftone Method With Edge Enhancement and Moire'Suppression," J. Opt. Soc. Amer. Vol 66, No. 10, pp. 985-989, October, 1976, U.S. Pat. No. 4,051,536 to Roetling and U.S. Pat. No. 4,633,327 to Roetling, herein incorporated by reference.

It should be noted that the use of the term "thresholding" throughout this description is meant to encompass other ways of making a distance decision between the input optical density value and the output optical density value. It will also be appreciated that while the description has referred to binary level quantization, the systems which provide multi-level output pixels other than two may use the invention as described with appropriate modifications to account for the number of pixel levels that can be produced in the output. Additionally, the system can be used to convert color data from a large set of possible color values to a smaller set of color values.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method of quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, including the steps:

for each group of pixels to be quantized, determining an average gray level input value for the image over an area of a halftone cell including the pixels;

determining a screen sum that is the addition of a stored screen value for the pixels determined by a position of the pixel within the area of the halftone cell, and the pixel value to produce screened pixel values;

thresholding the screened pixel value with a value T to obtain output optical density values that are a member of the output set of 'd' optical density values, and directing said values to an output;

determining from the thresholded pixel values an average gray output value for the image over the area of the halftone cell;

determining an error value, that is a difference between the average gray output value and the average gray input value;

storing a weighted portion of the error value for each of a set of halftone cells in an error distribution neighborhood;

updating an error buffer holding error terms to be added to unprocessed halftone cells in the image with the weighted error value;

determining an error sum that is the addition of an error term, and the average input gray level value, comparing the error sum and the average gray output value; and responsive to said comparison, adjusting value T so that the average gray level between of the input image and the output image are substantially equal.

2. A method of quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, including the steps:

for each group of pixels to be quantized, determining an average gray level input value for the image over an area of a halftone cell including the pixels;

determining a screen sum that is the addition of a stored screen value for the pixel determined by a position of the pixel within the area of the halftone cell, and the pixel value to produce a screened pixel value;

thresholding the screened pixel values with a value T to obtain an output optical density value that is a member of the output set of 'd' optical density values, and directing said value to an output;

determining from the thresholded pixel values an average gray output value for the image over the area of the halftone cell;

modifying the average gray input value by an error term determined in quantizing pixels in at least one previous halftone cell to produce a modified gray input value;

determining an error value, that is a difference between the average gray output value and the modified average gray input value;

determining a weighted error value, that is a function of the error value, for each of a set of pixels in an error distribution neighborhood;

updating an error buffer holding error terms to be added to unprocessed halftone cells in the image with the weighted error value;

comparing the modified gray input value sum and the average gray output value; and responsive to said comparison, adjusting value T so that the average gray level between of the input image and the output image are substantially equal.

3. A method of quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, including the steps:

thresholding an optical density value of each pixel having an original optical density value against at least one threshold value T, to obtain an optical density value that is a member of the output set of 'd' optical density values;

for a set of pixels in the image forming a halftone cell determining a difference between an average input gray value of the image and an average gray output value of the thresholded image, and distributing a weighted portion of said difference to at least one unprocessed halftone cell;

comparing a sum of the average gray input level and a weighted portion of the difference determined for a previously processed halftone cell, with the average output gray level value for the cell, and dynamically varying said at least one threshold value T in accordance with the comparison, so that said input gray level value and said output gray level values are substantially equal.

4. A method of quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, including the steps:

thresholding an optical density value of each pixel having an original optical density value against at least one threshold value T, to obtain an optical density value that is a member of the output set of 'd' optical density values;

for a set of pixels in the image forming a halftone cell, determining an error that is the difference between an average input gray value of the image modified by the addition of a weighted error portion from at least one previously processed halftone cell, and an average gray output value of the thresholded image, and distributing a weighted portion of said error to at least one unprocessed halftone cell;

comparing the modified average gray input level, with the average output gray level value for the cell, and dynamically varying said at least one threshold value T in accordance with the comparison, so that said input gray level value and said output gray level values are substantially equal.

5. An arrangement for quantizing pixel values in an image formed by a plurality of pixels, each pixel having a value representing an optical density of the image at a location within the image, and having an original optical density value associated therewith selected from one of a set of 'c' original optical density values that has a number of members larger than a desired output set of 'd' optical density values, comprising:

a source of pixels having one of 'c' original optical density values;

an adder for summing a stored screen value and a pixel value of a pixel to be quantized, said screen value received from a screen memory and determined by a position of the pixel to be quantized within the area of a halftone cell, to produce a screened pixel value;

an adjustable thresholding means for thresholding the screened pixel value with a value T to obtain an output optical density value that is a member of the output set of 'd' optical density values;

an image data output, directing pixels having an output optical density value that is one of 'd' optical density values out of the arrangement;

an input integrator, determining an average gray input value for the image over an area of the halftone cell including the pixel to be processed;

an output integrator, determining from the output of the adjustable thresholding means, an average gray level value for output image data, over an area of the halftone cell including the pixel;

a gray error comparator, for comparing the average gray output value of the image and the average gray input value, and producing a gray error that is the difference therebetween;

a gray error memory, storing gray error terms, each gray error term a weighted portion of the determined gray error, to be applied to each halftone cell in a predetermined neighborhood thereof; and an adder for summing a gray error term stored in the gray error term memory and the average gray input value, to produce a modified average gray input value; and means for adjusting T, having as inputs the modified average gray input value and the output gray value, so that the average gray input value and the average gray output value are substantially equal.

6. An arrangement for quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, comprising:
- a source of image data including pixels having an original optical density value that is one of 'c' original optical density values;
- an adder for summing a stored screen value and a pixel value of a pixel to be quantized, said screen value received from a screen memory and determined by a position of the pixel to be quantized within the area of a halftone cell, to produce a screened pixel value;
- an adjustable thresholding means for thresholding the screened pixel value with a value T to obtain an output optical density value that is a member of the output set of 'd' optical density values;
- an image data output, directing pixels having an output optical density value that is one of 'd' optical density values out of the arrangement;
- an input integrator, determining an average gray input value for the image over an area of the halftone cell including the pixel to be processed;
- an adder for summing a gray error term stored in a gray error term memory and the average gray input value, to produce a modified average gray input value; and
- an output integrator, determining from the output of the adjustable thresholding means, an average gray level value for output image data, over an area of the halftone cell including the pixel;
- a gray error comparator, for comparing the average gray output value of the image and the modified average gray input value, and producing a gray error that is the difference therebetween;
- a gray error term memory, storing gray error terms, each gray error term a weighted portion of the determined gray error, to be applied to each halftone cell in a predetermined neighborhood thereof; and
- means for adjusting T so that the modified average gray input value and the average gray output value are substantially equal.

7. An arrangement for quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, comprising:
- means for thresholding an optical density value of each pixel having an original optical density value against at least one threshold value T, to obtain an optical density value that is a member of the output set of 'd' optical density values;
- means for determining, for a set of pixels in the image forming a halftone cell, a difference between an average input gray value of the image and an average gray output value of the thresholded image, and distributing a weighted portion of said difference to at least one unprocessed halftone cell;
- means for comparing the sum of the average gray input level and the determined difference, with the average output gray level value for the cell, and dynamically varying said at least one threshold value T in accordance with the comparison, so that said input gray level value and said output gray level values are substantially equal.

8. An arrangement for quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, comprising:
- means for thresholding an optical density value of each pixel having an original optical density value against at least one threshold value T, to obtain an optical density value that is a member of the output set of 'd' optical density values;
- means for determining, for a set of pixels in the image forming a halftone cell, a difference between an average input gray value of the image modified by the addition of an error term from at least one previously processed halftone cell, and an average gray output value of the thresholded image, and distributing a weighted portion of said difference to at least one unprocessed halftone cell;
- means for comparing the sum of the average gray input level and the determined difference, with the average output gray level value for the cell, and dynamically varying said at least one threshold value T in accordance with the comparison, so that said input gray level value and said output gray level values are substantially equal.

9. A method of quantizing pixel values in an image formed by a plurality of pixels, each pixel representing an optical density of the image at a location within the image, and having an original optical density value associated therewith selected from one of a set of 'c' original optical density values that has a number of members larger than a desired output set of 'd' optical density values, including steps:
- receiving input pixel values for the image;
- averaging pixels values in an area corresponding to a halftone cell in the image, to produce an average gray input value for the halftone cell;
- adding a gray error term stored in an error term buffer from at least one previously processed halftone cell, to the average gray input value, and storing the modified average gray input value;
- calculating an integer part and fractional part of the modified gray input value, where the integer part is the modified average gray input value in integer pixel units, while the fractional part is the difference between the integer part and the modified gray input value;
- storing to the error term buffer a set of gray error terms, each gray error term a weighted portion of the fractional part of the modified gray input value, to be applied to each halftone cell in a predetermined neighborhood thereof;
- determining a screen sum that is the addition of an input pixel value and a stored screen value for the pixel value determined by a position of the pixel within the area of the halftone cell;
- for the cell, arranging the screen sums in order of value;
- beginning with the first screen sum, setting a number of pixels represented by the screen sums in the halftone cell to a selected state, the number of pixels set to the selected state equal to the integer calculated integer part.

* * * * *